Figure 1E:
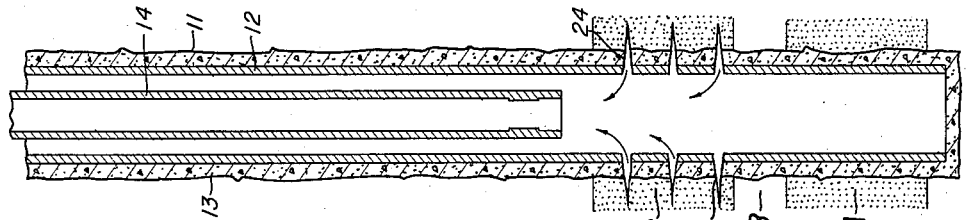
Figure 1D:
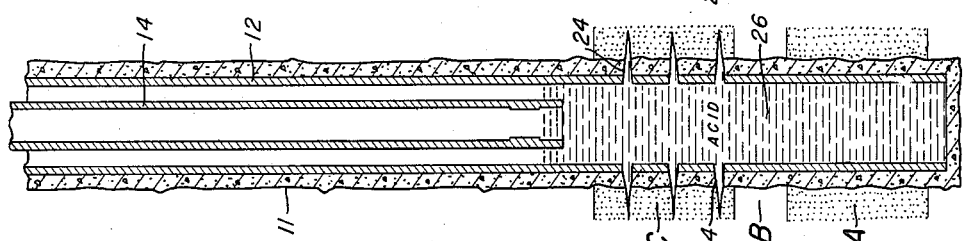

April 29, 1958   C. E. REISTLE, JR   2,832,415
PERFORATING WELLS
Filed Oct. 12, 1955

INVENTOR.
Carl E. Reistle, Jr.,
BY

ATTORNEY.

2,832,415

PERFORATING WELLS

Carl E. Reistle, Jr., Houston, Tex., assignor, by mesne assignments, to Esso Research and Engineering Company, Elizabeth, N. J., a corporation of Delaware Application October 12, 1955, Serial No. 540,067

6 Claims. (Cl. 166—22)

The present invention is directed to a method for completing wells. More particularly, the present invention is directed to a method for perforating wells. In its more specific aspects, the invention has to do with forming clean perforations in subsurface earth formations.

The present invention may be briefly described as a method for forming clean perforations in a well bore penetrating a subsurface earth interval, zone, or stratum from which desirable earth fluids, such as oil and/or gas, water, and the like may be produced. In the present invention, a body of a suspension of an acid-soluble material is arranged in the well bore, which may have a casing arranged therein, adjacent the earth interval from which the desired fluid is to be produced. The well bore and/or casing, if one is employed, is then perforated by operating a perforator, such as a bullet or shaped charge gun perforator, whereby an acid soluble filter plug is formed in the resulting perforations. Thereafter, the filter plug is treated with an acid whereby the filter plug is dissolved and the desirable earth fluid is then produced through the treated, clean perforations.

The acid-soluble material is preferably employed as an aqueous suspension and may include materials, such as colloidal clay, which contains montmorillonites, such as calcium and sodium montmorillonites, bentonite, and the like. The acid-soluble material includes a material, such as powdered or finely divided calcium carbonate which may be used with the bentonite in a ratio of bentonite to calcium carbonate in a range from 1:5 to about 1:10. The suspension of bentonite and calcium carbonate may suitably contain a small amount of alkaline material, such as an alkali metal hydroxide, for example, sodium hydroxide and the like. Other acid-soluble materials may be used and for purposes of example finely divided or powdered acid-soluble materials, such as lime, magnesium hydroxide, zinc oxide, stannous oxide, calcium sulfide, ferrous hydroxide, ferric hydroxide, barium sulfide, ferrous lactate, magnesium lactate, calcium lactate, and the like, may be formed in preferably an aqueous suspension and employed in the well bore. Preferably, calcium carbonate is employed.

In the completion of oil and/or gas wells by gun perforating, the well fluids under considerable hydrostatic head will enter the perforations formed by the perforator to form filter cakes in the perforations or holes. These well fluids normally are made up of a liquid carrier body plus a solid material and are employed as drilling fluids in drilling the well. The density of the drilling fluid is such as to provide a pressure differential toward the formation in order to maintain the well under control until well completion equipment may be installed. Filtration results from this pressure differential and causes a hard filter cake of very low permeability to be deposited from the drilling fluid in the perforations. When employing a shaped charge gun perforator, solid material from the shaped charge is also included in the filter cake. These filter cakes or plugs hinder the flow of oil and/or gas into the well bore and later may be a barrier to a good cementing job when it is desired to plug the perforations by cementing for recompleting or reworking of the well. In many instances when a well is brought in through perforations, the filter plugs are only partially expelled therefrom, if at all, which results in an unsatisfactory and ineffective perforating job. In many instances, the plugging of the perforations with the material which forms a filter cake therein may absolutely nullify the perforation operation.

In accordance with the present invention wherein the well is perforated in an acid-soluble material to form an acid-soluble filter plug which is subsequently removed by treatment with acid, clean perforations are formed and the wells are producible without hindrance from the filter plugs.

The acid-soluble filter plugs may suitably be treated with a mineral acid preferably hydrochloric acid which may suitably be inhibited to prevent corrosion of exposed ferrous metal surfaces in the well equipment. Other mineral acids, such as sulfuric acid and nitric acid, may be used and the organic acids may also be employed. Whatever acids may be used it may be desirable to inhibit same to mitigate attack by the acid on the ferrous metal and other metallic equipment.

The present invention will be further illustrated by reference to the drawing in which Figs. 1a to 1e are stepwise illustrations of the practice of the present invention.

Referring now to the drawing in which identical numerals will be employed to designate identical parts, numeral 11 designates a well bore drilled from the earth's surface to penetrate a plurality of earth formations A, B and C. A and C are productive earth intervals or zones, strata and the like which may contain oil and/or gas while interval B which separates intervals A and C may be non-productive.

Arranged in the well bore 11 is a casing 12 which is cemented in place with a primary cement job 13. Run into and preferably permanently set in the well is a tubing 14 which may be arranged with its lower open end 15 above the interval C. With the tubing permanently set in the well and as shown in Fig. 1a, if it is desired to recomplete or service the well at a lower interval, a tubular extension member, such as illustrated by the numeral 16 may be lowered on a wire line, not shown, and landed, anchored or supported in a landing nipple 17 and sealed therein with packing 18. The tubular extension member 16 then may be used to form a path down to the interval C. The extension member 16 is provided with an open upper end 19 having a fishing neck 20 for removal of the tubular extension member from the tubing 14. Fig. 1a shows the well after cementing and tubing arranged therein and Fig. 1b shows the tubing 14 with an acid-soluble material indicated by the numeral 21 arranged in a body in the well adjacent the hydrocarbon productive interval C. Drilling mud or fluid in the well in Fig. 1a is removed prior to locating the acid-soluble suspension, as shown in Fig. 1b. All or part of the drilling mud is replaced by the suspension. For example, only sufficient suspension may be used to protect the interval C which is to be perforated. If desired, the body 21 may be deposited in the well using the tubular extension member 16 if permanent well completion operations are employed or if permanent well completions are not used the tubing 14 would be lowered as indicated by the dotted lines and then raised back to the position as shown in Fig. 1b. In Fig. 1b the body of suspension 21 is shown below the drilling mud 21b, the drilling mud 21b having been displaced by the suspension 21 to cover the interval C. It may be desirable to provide the suspension with sufficient weight and/or viscosity to displace the drilling mud and to this end suitable weighting materials and viscosity increasing agents may be used.

Figure 1C:
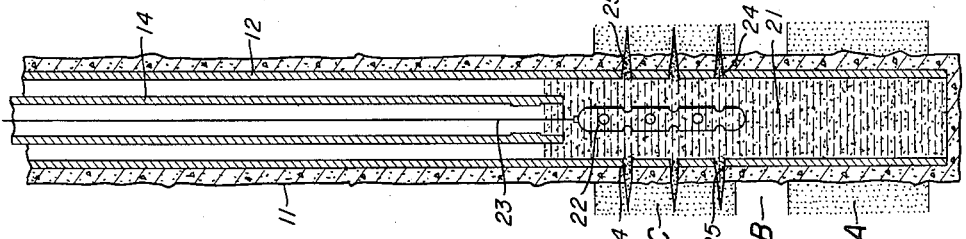
Figure 1B:
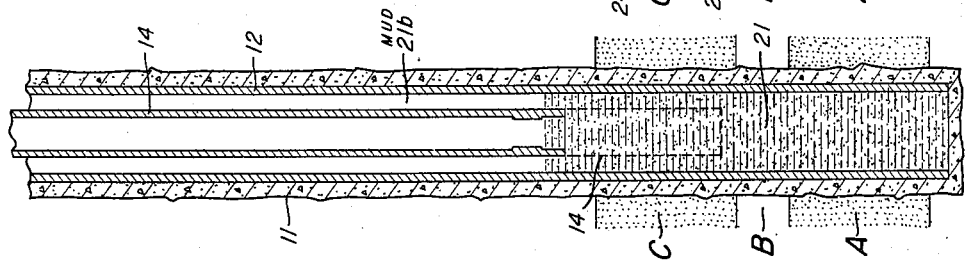
Figure 1A:
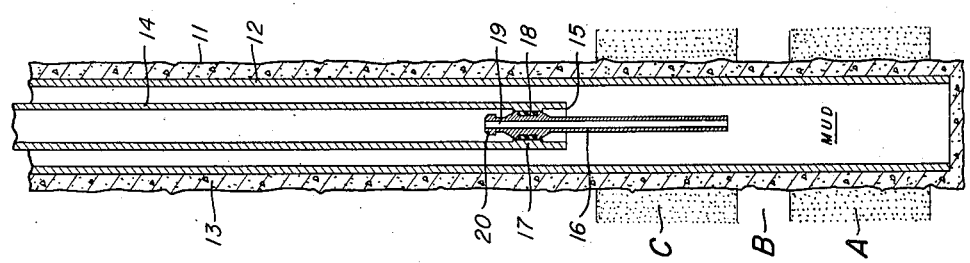

In Fig. 1c a tubing gun perforator 22 is lowered on a wire line 23 through the tubing 14 adjacent the interval C. This tubing gun perforator 22 may be a bullet or shaped charge perforator which is then fired to form the perforations 24 penetrating the casing 12, cement 13 and the formation or interval C. These perforations, by virtue of the acid-soluble suspension 21, become plugged with filter plugs indicated by numeral 25 of an acid-soluble material. After firing of the gun perforator 22 and forming the perforations 24 containing the acid-soluble filter plugs 25, any residual acid-soluble suspension in the casing 12 may then be removed by manipulating the tubing 14 or by using the tubular extension member 16, as shown in Fig. 1a. Thereafter a body of acid, such as 26 is deposited in the well casing below the tubing 14 which causes the dissolution of the filter plug 25 leaving the perforations 24 in a clean condition and providing an unobstructed path from the formation C into the well bore. Thereafter, as shown in Fig. 1e, the acid is removed or circulated from the well casing 12 and production is then had from the interval C through the clean perforations 24.

After production has ceased from interval C or has become uneconomical, the perforations 24 may then be sealed by depositing cement adjacent the interval C to form plugs in the perforations 24. After perforations 24 have been sealed off with cement, then the interval A or other productive intervals, as may be desired, may be gun perforated in an acid-soluble suspension to form acid-soluble filter plugs which may be removed by treating the acid soluble filter plugs with an acid as has been described. Where recompletion operations are performed and an interval such as C is sealed, it may be desirable to protect the sealed interval against attack by acid since the sealed perforations may become unplugged if contacted with acid. In those instances, a body of oil, drilling mud and the like, may be arranged adjacent the sealed interval at least during the time the perforated interval is being treated with acid to dissolve the acid-soluble plug.

In order to illustrate the invention further, several compositions were prepared and subjected to various tests. Thereafter filter cakes prepared from the composition were treated with hydrochloric acid to determine the solubility of the filter cake in the acid. The results of these tests are shown in the following table:

sions. However, under some conditions, the oil emulsion suspensions may be desirable. When using an oil emulsion solution, a stabilizer, such as calcium lignosulfonate, may be used. When the acid soluble material, such as calcium carbonate, is treated with a mineral acid and the like, carbon dioxide is liberated which aids in the destruction of the filter plug.

From the foregoing examples and the description taken with the drawing, it will be seen that wells may be readily completed by gun perforating and the like without plugging the wells and allowing production to be had through clean perforations.

The nature and objects of the present invention having been completely described and illustrated, what I wish to claim as new and useful and to secure by Letters Patent is:

1. A method for forming clean perforations in a cased well bore penetrating a subsurface earth interval which comprises locating a body of a suspension of an acid soluble material in said well bore adjacent said interval, said acid soluble material containing a component selected from the group consisting of calcium carbonate, sodium hydroxide, lime, magnesium hydroxide, zinc oxide, stannous oxide, calcium sulfide, ferrous hydroxide, ferric hydroxide, barium sulfide, ferrous lactate, magnesium lactate and calcium lactate, gun perforating said interval in said body whereby an acid soluble filter plug is formed in the resulting perforations in said casing and said interval, and then treating said filter plug with an acid, selected from the group consisting of hydrochloric acid, sulfuric acid and nitric acid whereby said filter plug is dissolved.

2. A method in accordance with claim 1 in which the suspension is an aqueous suspension of bentonite and calcium carbonate and the acid is hydrochloric acid.

3. A method in accordance with claim 2 in which the bentonite and calcium carbonate are employed in a ratio in the range from about 1:5 to about 1:10.

4. A method for forming clean perforations in a well bore penetrating a productive subsurface earth interval having a well casing arranged therein which comprises locating a body of a suspension of an acid soluble material in said well casing adjacent said interval, said acid soluble material containing a component selected from the group consisting of calcium carbonate, sodium

*Table*

| Composition | Stability | Initial Gel Strength, Grams Stormer | Viscosity at 600 R.P.M. Stormer, cps. | API Filtration, cc. in 30 Min. | Observations of Filter Cake |
| --- | --- | --- | --- | --- | --- |
| 10 lbs. bentonite per bbl. water<br>50 lbs. calcium carbonate per bbl. water<br>Trace sodium hydroxide | No settling noted. | 2 | 9 | 23 | Thin, firm cake; readily soluble. |
| 20 lbs. starch per bbl. water<br>5 lbs. bentonite per bbl. water<br>0.5 lb. sodium hydroxide per bbl. water<br>50 lbs. calcium carbonate per bbl. water | Settled rather badly. | 2 | 37 | 13 | Do. |

It will be seen from these data that a composition containing bentonite and calcium carbonate in the ratio of 1:5 forms a thin, firm filter cake which was readily soluble in acid from which settling was not obtained. Whereas, one containing starch, bentonite and calcium carbonate where the ratio of bentonite to calcium carbonate was 1:10 rather than 1:5, as in the first composition, resulted in a composition which settled but yet formed a thin, firm cake which was also readily soluble in the acid. It is preferred, therefore, that the ratio of bentonite to calcium carbonate be in the lower portion of the range and preferably from 1:5 to 1:7.5.

It is preferable to employ an aqueous suspension of acid-soluble material since suspensions formed in oil-in-water emulsions, while settling out slowly, did not dissolve as readily as those formed from aqueous suspenhydroxide, lime, magnesium hydroxide, zinc oxide, stannous oxide, calcium sulfide, ferrous hydroxide, ferric hydroxide, barium sulfide, ferrous lactate, magnesium lactate and calcium lactate, inserting a gun perforator into said body, operating said perforator to penetrate said casing and said earth interval adjacent said casing whereby an acid soluble filter plug is formed in the resulting perforations, treating said plugged perforations with an acid, selected from the group consisting of hydrochloric acid, sulfuric acid and nitric acid whereby said filter plug is dissolved, and then producing a desirable earth fluid through said treated perforations.

5. A method in accordance with claim 4 in which the suspension is an aqueous alkaline suspension of bentonite and calcium carbonate and the acid is hydrochloric.

6. A method in accordance with claim 5 in which the bentonite and calcium carbonate are employed in a ratio in the range from about 1:5 to about 1:10.

References Cited in the file of this patent

UNITED STATES PATENTS

| | | |
|---|---|---|
| 2,045,899 | Davis | June 30, 1936 |
| 2,193,807 | Dieterich | Mar. 19, 1940 |
| 2,591,807 | Greene | Apr. 8, 1952 |
| 2,693,856 | Allen | Nov. 9, 1954 |
| 2,699,213 | Cardwell et al. | Jan. 11, 1955 |
| 2,718,264 | Allen et al. | Sept. 20, 1955 |